(12) United States Patent
Sinha et al.

(10) Patent No.: US 10,635,412 B1
(45) Date of Patent: Apr. 28, 2020

(54) ONLINE PROFESSIONAL BADGE

(75) Inventors: Ved Ranjan Sinha, Menlo Park, CA (US); Yuet Ping Pong, Cupertino, CA (US)

(73) Assignee: ELANCE, Inc., Mountain View, CA (US)

(*) Notice: Subject to any disclaimer, the term of this patent is extended or adjusted under 35 U.S.C. 154(b) by 328 days.

(21) Appl. No.: 12/474,147

(22) Filed: May 28, 2009

(51) Int. Cl.
*G06F 8/38* (2018.01)
*G06F 9/451* (2018.01)

(52) U.S. Cl.
CPC ............. *G06F 8/38* (2013.01); *G06F 9/451* (2018.02)

(58) Field of Classification Search
USPC .................................................. 705/2, 37
See application file for complete search history.

(56) References Cited

U.S. PATENT DOCUMENTS

| | | |
|---|---|---|
| 4,703,325 A | 10/1987 | Chamberlin et al. |
| 4,799,156 A | 1/1989 | Shavit et al. |
| 5,008,853 A | 4/1991 | Bly et al. |
| 5,220,657 A | 6/1993 | Bly et al. |
| 5,548,506 A | 8/1996 | Srinivasan |
| 5,557,515 A | 9/1996 | Abbruzzese et al. |
| 5,592,620 A | 1/1997 | Chen et al. |
| 5,664,115 A | 9/1997 | Fraser |
| 5,715,402 A | 2/1998 | Popolo |
| 5,732,400 A | 3/1998 | Mandler et al. |
| 5,794,207 A | 8/1998 | Walker et al. |
| 5,835,896 A | 11/1998 | Fisher et al. |
| 5,842,178 A | 11/1998 | Giovannoli |
| 5,862,223 A * | 1/1999 | Walker et al. .............. 705/50 |
| 5,905,975 A | 5/1999 | Ausubel |
| 5,924,082 A | 7/1999 | Silverman et al. |
| 5,949,976 A | 9/1999 | Chappelle |
| 5,956,715 A | 9/1999 | Glasser et al. |

(Continued)

FOREIGN PATENT DOCUMENTS

| | | |
|---|---|---|
| EP | 0 952 536 A1 | 10/1999 |
| WO | WO 01/15050 A1 | 3/2001 |

(Continued)

OTHER PUBLICATIONS

Massimo Paolucci et al. "Semantic Matching of Web Services Capabilities" Carnegie Mellon University, 2002, Spring-Verlag Berlin Heidenberg, p. 333-347.*

(Continued)

*Primary Examiner* — Christine M Behncke
*Assistant Examiner* — Matthew H Divelbiss
(74) *Attorney, Agent, or Firm* — Haverstock & Owens LLP

(57) ABSTRACT

An online professional badge allows viewers to view real-time information about the service provider. Typically, the real-time information includes a subset of information provided in a profile belonging to the service provider within a services exchange medium. The online professional badge resides anywhere on the Internet outside the services exchange medium. The online professional badge allows the service provider to actively market the service provider as a professional in, but not limited to, dating and social networks, blogs, web pages, email messages, chat messages, and/or banner advertisements. As such, viewers are able to learn about the service provider and/or initiate a hiring process without accessing other sites.

25 Claims, 6 Drawing Sheets

(56) References Cited

U.S. PATENT DOCUMENTS

| | | | |
|---|---|---|---|
| 5,966,130 A | 10/1999 | Benman, Jr. | |
| 5,987,498 A | 11/1999 | Athing et al. | |
| 6,009,154 A | 12/1999 | Rieken et al. | |
| 6,041,307 A | 3/2000 | Ahuja et al. | |
| 6,049,777 A | 4/2000 | Sheena et al. | |
| 6,061,665 A | 5/2000 | Bahreman | |
| 6,064,980 A | 5/2000 | Jacobi et al. | |
| 6,078,906 A | 6/2000 | Huberman | |
| 6,092,049 A | 7/2000 | Chislenko | |
| 6,101,482 A | 8/2000 | DiAngelo et al. | |
| 6,119,101 A | 9/2000 | Peckover | |
| 6,119,149 A | 9/2000 | Notani | |
| 6,128,624 A | 10/2000 | Papierniak et al. | |
| 6,141,653 A | 10/2000 | Conklin et al. | |
| 6,154,731 A | 11/2000 | Monks et al. | |
| 6,161,099 A | 12/2000 | Harrington et al. | |
| 6,208,659 B1* | 3/2001 | Govindarajan et al. | 370/410 |
| 6,223,177 B1 | 4/2001 | Tatham et al. | |
| 6,226,031 B1 | 5/2001 | Barraclough et al. | |
| 6,233,600 B1* | 5/2001 | Salas et al. | 709/201 |
| 6,311,178 B1 | 10/2001 | Bi et al. | |
| 6,336,105 B1 | 1/2002 | Conklin et al. | |
| 6,374,292 B1 | 4/2002 | Srivastava et al. | |
| 6,385,620 B1 | 5/2002 | Kurziua | |
| 6,415,270 B1 | 7/2002 | Rackson et al. | |
| 6,415,284 B1 | 7/2002 | D'Souza et al. | |
| 6,442,528 B1 | 8/2002 | Notani et al. | |
| 6,484,153 B1 | 11/2002 | Walker et al. | |
| 6,557,035 B1 | 4/2003 | McKnight | |
| 6,564,246 B1 | 5/2003 | Varma et al. | |
| 6,567,784 B2* | 5/2003 | Bukow | 705/7.14 |
| 6,591,011 B1 | 7/2003 | Nielsen | |
| 6,598,026 B1 | 7/2003 | Ojha et al. | |
| 6,618,734 B1 | 9/2003 | Williams | |
| 6,662,194 B1 | 12/2003 | Joao | |
| 6,735,570 B1 | 5/2004 | Lacy et al. | |
| 6,832,176 B2 | 12/2004 | Hartigan et al. | |
| 6,859,523 B1 | 2/2005 | Jilk | |
| 6,871,181 B2 | 3/2005 | Kansal | |
| 6,931,385 B1* | 8/2005 | Halstead et al. | 706/46 |
| 6,938,048 B1 | 8/2005 | Jilk et al. | |
| 7,069,242 B1* | 6/2006 | Sheth et al. | 705/37 |
| 7,096,193 B1 | 8/2006 | Beaudoin et al. | |
| 7,155,400 B1 | 12/2006 | Jilk et al. | |
| 7,310,415 B1 | 12/2007 | Short | |
| 7,346,535 B2 | 3/2008 | Younger | |
| 7,406,443 B1 | 7/2008 | Fink et al. | |
| 7,437,327 B2 | 10/2008 | Lam et al. | |
| 7,444,374 B1* | 10/2008 | Baker | 709/206 |
| 7,466,810 B1 | 12/2008 | Quon et al. | |
| 7,505,919 B2 | 3/2009 | Richardson | |
| 7,587,336 B1 | 9/2009 | Wallgren et al. | |
| 7,752,080 B1 | 7/2010 | Greener | |
| 7,778,938 B2 | 8/2010 | Stimac | |
| 7,814,085 B1 | 10/2010 | Pfleger | |
| 7,966,265 B2 | 6/2011 | Schalk et al. | |
| 8,024,670 B1 | 9/2011 | Rahmatian | |
| 8,156,051 B1 | 4/2012 | Shah | |
| 8,224,755 B2* | 7/2012 | Goodman | G06F 21/62 705/317 |
| 8,380,709 B1* | 2/2013 | Diller et al. | 707/723 |
| 8,504,403 B2 | 8/2013 | Deich | |
| 8,512,143 B2 | 8/2013 | Jung et al. | |
| 8,517,742 B1 | 8/2013 | Johnson | |
| 8,682,683 B2 | 3/2014 | Ananian | |
| 8,700,694 B2 | 4/2014 | Archbold | |
| 8,768,349 B1* | 7/2014 | Dhanoa et al. | 455/432.2 |
| 8,843,388 B1 | 9/2014 | Westfall | |
| 9,454,576 B1 | 9/2016 | Kapoor | |
| 2001/0011222 A1 | 8/2001 | McLauchlin et al. | |
| 2001/0032170 A1 | 10/2001 | Sheth | |
| 2001/0034630 A1 | 10/2001 | Mayer et al. | |
| 2001/0034688 A1 | 10/2001 | Annunziata | |
| 2001/0039508 A1 | 11/2001 | Nagler | |
| 2001/0041988 A1 | 11/2001 | Lin | |
| 2002/0007300 A1 | 1/2002 | Slatter | |
| 2002/0010685 A1 | 1/2002 | Ashby | |
| 2002/0023046 A1 | 2/2002 | Callahan et al. | |
| 2002/0026398 A1 | 2/2002 | Sheth | |
| 2002/0032576 A1* | 3/2002 | Abbott et al. | 705/1 |
| 2002/0052773 A1 | 5/2002 | Kraemer | |
| 2002/0054138 A1* | 5/2002 | Hennum | 345/804 |
| 2002/0078432 A1 | 6/2002 | Charisius et al. | |
| 2002/0103687 A1 | 8/2002 | Kipling | |
| 2002/0120522 A1 | 8/2002 | Yang | |
| 2002/0120554 A1 | 8/2002 | Vega | |
| 2002/0129139 A1 | 9/2002 | Ramesh | |
| 2002/0133365 A1 | 9/2002 | Grey et al. | |
| 2002/0161707 A1 | 10/2002 | Cole et al. | |
| 2002/0194077 A1 | 12/2002 | Dutta | |
| 2002/0194112 A1 | 12/2002 | dePinto et al. | |
| 2003/0004738 A1 | 1/2003 | Chander | |
| 2003/0014294 A1* | 1/2003 | Yoneyama | G06Q 10/063112 705/7.14 |
| 2003/0046155 A1 | 3/2003 | Himmel et al. | |
| 2003/0050811 A1 | 3/2003 | Freeman, Jr. | |
| 2003/0055780 A1 | 3/2003 | Hansen et al. | |
| 2003/0061266 A1 | 3/2003 | Ouchi | |
| 2003/0086608 A1 | 5/2003 | Frost | |
| 2003/0097305 A1 | 5/2003 | Ogino et al. | |
| 2003/0101126 A1 | 5/2003 | Cheung et al. | |
| 2003/0120603 A1* | 6/2003 | Kojima et al. | 705/54 |
| 2003/0182171 A1 | 9/2003 | Vianello | |
| 2003/0191684 A1* | 10/2003 | Lumsden et al. | 705/11 |
| 2003/0212246 A1 | 11/2003 | Eleveld | |
| 2003/0212627 A1 | 11/2003 | Burns et al. | |
| 2003/0220843 A1 | 11/2003 | Lam et al. | |
| 2003/0233372 A1 | 12/2003 | Warner | |
| 2004/0063463 A1 | 4/2004 | Boivin | |
| 2004/0064436 A1 | 4/2004 | Breslin et al. | |
| 2004/0122926 A1 | 6/2004 | Moore et al. | |
| 2004/0128224 A1 | 7/2004 | Dabney et al. | |
| 2004/0215560 A1 | 10/2004 | Amalraj et al. | |
| 2004/0230466 A1 | 11/2004 | Davis et al. | |
| 2004/0230511 A1 | 11/2004 | Kannan et al. | |
| 2004/0230521 A1 | 11/2004 | Broadbent et al. | |
| 2004/0241627 A1 | 12/2004 | Delfing | |
| 2004/0243428 A1 | 12/2004 | Black | |
| 2005/0033633 A1 | 2/2005 | LaPasta | |
| 2005/0043998 A1 | 2/2005 | Bross et al. | |
| 2005/0097613 A1 | 5/2005 | Ulate et al. | |
| 2005/0131830 A1* | 6/2005 | Juarez et al. | 705/51 |
| 2005/0222907 A1 | 10/2005 | Pupo | |
| 2006/0031177 A1 | 2/2006 | Rule | |
| 2006/0074708 A1 | 4/2006 | Woods | |
| 2006/0080116 A1 | 4/2006 | Maguire | |
| 2006/0095366 A1 | 5/2006 | Sheth et al. | |
| 2006/0106846 A1 | 5/2006 | Schulz | |
| 2006/0122850 A1* | 6/2006 | Ward et al. | 705/1 |
| 2006/0143228 A1 | 6/2006 | Odio-Paez | |
| 2006/0159109 A1* | 7/2006 | Lamkin | G11B 27/10 370/401 |
| 2006/0195428 A1* | 8/2006 | Peckover | 707/3 |
| 2006/0212359 A1 | 9/2006 | Hudgeon | |
| 2006/0284838 A1 | 12/2006 | Tsatalos | |
| 2007/0005536 A1 | 1/2007 | Caswell et al. | |
| 2007/0022040 A1 | 1/2007 | Gordon | |
| 2007/0027746 A1 | 2/2007 | Grabowich | |
| 2007/0067196 A1 | 3/2007 | Usui | |
| 2007/0078699 A1 | 4/2007 | Scott et al. | |
| 2007/0088601 A1 | 4/2007 | Money et al. | |
| 2007/0112671 A1 | 5/2007 | Rowan | |
| 2007/0130059 A1 | 6/2007 | Lee et al. | |
| 2007/0162379 A1 | 7/2007 | Skinner | |
| 2007/0174180 A1 | 7/2007 | Shin | |
| 2007/0174394 A1 | 7/2007 | Jayaweera | |
| 2007/0185723 A1 | 8/2007 | Shellnutt | |
| 2007/0192130 A1 | 8/2007 | Sandhu | |
| 2007/0233510 A1 | 10/2007 | Howes | |
| 2008/0010598 A1* | 1/2008 | Smilowitz et al. | 715/745 |
| 2008/0046834 A1 | 2/2008 | Yu et al. | |
| 2008/0059267 A1 | 3/2008 | Hamilton | |
| 2008/0059523 A1* | 3/2008 | Schmidt et al. | 707/104.1 |
| 2008/0065444 A1 | 3/2008 | Stroman et al. | |

(56) References Cited

U.S. PATENT DOCUMENTS

| | | | |
|---|---|---|---|
| 2008/0104495 A1* | 5/2008 | Craig | 715/205 |
| 2008/0134292 A1* | 6/2008 | Ariel et al. | 726/3 |
| 2008/0154783 A1 | 6/2008 | Rule et al. | |
| 2008/0184135 A1* | 7/2008 | Washburn et al. | 715/752 |
| 2008/0194228 A1* | 8/2008 | Pousti | G06Q 30/04 |
| | | | 455/406 |
| 2008/0209417 A1 | 8/2008 | Jackobson | |
| 2008/0244582 A1 | 10/2008 | Brown et al. | |
| 2008/0288582 A1* | 11/2008 | Pousti | G06Q 30/04 |
| | | | 709/203 |
| 2008/0294505 A1 | 11/2008 | Markowitz et al. | |
| 2008/0294688 A1 | 11/2008 | Brousard | |
| 2008/0313005 A1* | 12/2008 | Nessland | G06Q 10/06 |
| | | | 705/7.21 |
| 2009/0011395 A1 | 1/2009 | Schmidt et al. | |
| 2009/0017788 A1 | 1/2009 | Doyle et al. | |
| 2009/0055404 A1* | 2/2009 | Heiden | G06Q 30/02 |
| 2009/0055476 A1* | 2/2009 | Markus et al. | 709/204 |
| 2009/0112728 A1 | 4/2009 | Evers et al. | |
| 2009/0116403 A1* | 5/2009 | Callanan et al. | 370/254 |
| 2009/0132345 A1* | 5/2009 | Meyssami et al. | 705/10 |
| 2009/0150386 A1* | 6/2009 | Lichtblau | G06Q 30/08 |
| 2009/0177691 A1 | 7/2009 | Manfredi et al. | |
| 2009/0199185 A1 | 8/2009 | Slawson et al. | |
| 2009/0210282 A1* | 8/2009 | Elenbaas et al. | 705/9 |
| 2009/0241035 A1* | 9/2009 | Tseng et al. | 715/753 |
| 2009/0241172 A1* | 9/2009 | Sennett et al. | 726/4 |
| 2009/0249340 A1 | 10/2009 | Akiyama et al. | |
| 2009/0265243 A1* | 10/2009 | Karassner | G06Q 30/02 |
| | | | 705/14.54 |
| 2009/0288021 A1* | 11/2009 | Ioffe | G06F 9/451 |
| | | | 715/760 |
| 2009/0327081 A1* | 12/2009 | Wang et al. | 705/14.66 |
| 2010/0017253 A1 | 1/2010 | Butler et al. | |
| 2010/0088749 A1* | 4/2010 | Steeples | 726/4 |
| 2010/0144318 A1* | 6/2010 | Cable | G06Q 10/00 |
| | | | 455/412.1 |
| 2010/0161503 A1 | 6/2010 | Foster | |
| 2010/0162167 A1* | 6/2010 | Stallings | G06F 3/0482 |
| | | | 715/811 |
| 2010/0250322 A1 | 9/2010 | Norwood | |
| 2010/0287525 A1* | 11/2010 | Wagner | 717/100 |
| 2010/0324948 A1 | 12/2010 | Kumar et al. | |
| 2011/0106762 A1 | 5/2011 | Dane | |
| 2011/0107088 A1 | 5/2011 | Eng et al. | |
| 2011/0131146 A1 | 6/2011 | Skutnik | |
| 2011/0208665 A1 | 8/2011 | Hirsch | |
| 2011/0238768 A1 | 9/2011 | Habets et al. | |
| 2011/0302053 A1 | 12/2011 | Rigole | |
| 2012/0041832 A1 | 2/2012 | Sheth et al. | |
| 2012/0110087 A1 | 5/2012 | Culver et al. | |
| 2012/0143952 A1 | 6/2012 | Von Graf | |
| 2012/0150761 A1 | 6/2012 | Ananian | |
| 2013/0246294 A1 | 9/2013 | Pendyala et al. | |
| 2014/0108078 A1 | 4/2014 | Davis | |
| 2014/0222493 A1 | 8/2014 | Mohan et al. | |
| 2014/0358646 A1 | 12/2014 | Said et al. | |
| 2014/0377723 A1 | 12/2014 | Strong | |
| 2015/0032654 A1 | 1/2015 | Huff | |
| 2015/0134600 A1 | 5/2015 | Eisner et al. | |

FOREIGN PATENT DOCUMENTS

| | | |
|---|---|---|
| WO | WO 01/73645 A1 | 10/2001 |
| WO | WO 02/061531 A2 | 8/2002 |

OTHER PUBLICATIONS

John Bergland et al. "IBM WebSphere Telecommunications Web Services Server Programming Guide." Sep. 2008, ISBN 0738431427.*
U.S. Appl. No. 09/644,665, filed Aug. 24, 2000, Sheth et al.
U.S. Appl. No. 12/287,994, filed Oct. 14, 2008, Diller et al.
U.S. Appl. No. 12/287,997, filed Oct. 14, 2008, Diller et al.
U.S. Appl. No. 60/206,203, filed May 22, 2000, Anumolu et al.
U.S. Appl. No. 60/099,147, filed Oct. 15, 2007, Diller et al.
U.S. Appl. No. 61/131,920, filed Jun. 11, 2008, Diller et al.
ants.com web pages [online]. Ants.com [retrieved on Aug. 22, 2008]. Retrieved from the Internet: <URL: http://www.ants.com/ants/>.
bizbuyer.com web pages [online]. BizBuyer.com, Inc. [retrieved Aug. 18-21, 2000]. Retrieved from the Internet: <URL: http://www.bizbuyer.com/>.
BullhornPro web pages [online]. Bullhorn, Inc. [retrieved on Jan. 4, 2001]. Retrieved from the Internet: <URL: http://www.bullhornpro.com/>.
Cassidy, M., "Going for Broke," San Jose Mercury News, Monday, Aug. 16, 1999, pp. 1E and 4E, published in San Jose, CA.
efrenzy.com web pages [online]. eFrenzy, Inc. [retrieved on Aug. 22, 2000]. Retrieved from the Internet: <URL: http://www.efrenzy.com/index.isp>.
Eisenberg, D., "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.
eworkexchange.com web pages [online]. eWork Exchange, Inc. [retrieved on Aug. 18-22, 2000]. Retrieved from the Internet: <URL: http://www.eworks.com/>.
eWork Exchange web pages [online]. eWork Exchange, Inc. [retrieved on Jan. 5, 2001]. Retrieved from the Internet: <URL: http://www.eworks.com/>.
eWork ProSource web pages [online]. eWork Exchange, Inc. [retrieved on Jan. 3, 2001]. Retrieved from the Internet: <URL: http://www.ework.com/>.
FeeBid.com web pages [online]. FeeBid.com [retrieved on Dec. 18, 2000]. Retrieved from the Internet: <URL: http://www.feebid.com>.
freeagent.com web pages [online]. FreeAgent.com [retrieved Aug. 18-22, 2000]. Retrieved from the Internet: <URL: http://www.freeagent.com/>.
guru.com.com web pages [online]. Guru.com, Inc. [retrieved Aug. 18, 2000]. Retrieved from the Internet: <URL: http://www.guru.com/>.
Herhold, S., "Expert Advice is Collectible for Start-up," San Jose Mercury News, Monday, Aug. 16, 1999, pp. 1E and 6E, San Jose, CA.
hotdispatch.com web pages [online]. HotDispatch, Inc. [retrieved on Aug. 22, 2000]. Retrieved from the Internet: <URL: http://www.hotdispatch.com/>.
Humphreys, Paul et al., "A Just-in-Time Evaluation Strategy for International Procurement," MCB UP Limited, 1998, pp. 1-11.
"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.
imandi.com web pages [online]. Imandi Corporation [retrieved on Aug. 22, 2000]. Retrieved from the Internet: <URL: http://www.imandi.com/>.
Malone, Thomas W. et al., "The Dawn of the E-Lance Economy," Harvard Business Review, Sep.-Oct. 1998, pp. 145-152.
"Netscape Selects Netopia as the Exclusive 'Virtual Office' Offering on the New Netscape Small Business Source Service," PR Newswire, May 11, 1998, Mountain View and Alameda, California.
onvia.com web pages [online]. Onvia.com [retrieved Aug. 22, 2000]. Retrieved from the Internet: <URL: http://www.onvia.com/usa/home/index.cfm>.
Opus360 web pages [online]. Opus360 Corporation [retrieved on Jan. 3, 2001] Retrieved from the Internet: <URL: http://www.opus360com/>.
smarterwork.com web pges [online]. smarterwork.com, Inc. [retrieved on Aug. 22, 2000]. Retrieved from the Internet: <URL: http://www.smarterwork.com/>.
workexchange.com web pages [online]. WorkExchange, Inc. [retrieved Aug. 22, 2000]. Retrieved from the Internet: <URL: http://www.workexchange.com/unique/workexchange/index1.cfm>.

(56) References Cited

OTHER PUBLICATIONS

Davenport, Thomas H. and Keri Pearlson, "Two Cheers for the Virtual Office", summer 1998, abstract, retrieved from the Internet: <URL: http://www.pubservice.com/MSStore?ProductDetails.aspx?CPC=3944>.
PCT International Search Report and Written Opinion, PCT/US06/22734, dated Jun. 3, 2008, 5 pages.
Shalil Majithia et al, "Reputation-based Semantic Service Discovery", IEEE Computer Society,13th IEEE International Workshops on Enabling Technologies:Infrastructure for Collaborative Enterprises, 2004, pp. 1-6.
Ziqiang Xu et al, "Reputation-Enhanced QoS-based Web Services Discovery", School of Computing, Queen's University, Canada, 2007, pp. 1-8.
Massimo Paolucci et al. "Semantic Matching of Web Services Capabilities" Carnegie Mellon University, 2002, Springer-Verlag Berlin Heidelberg, p. 333-347.
morebusiness.com, "How to Write Winning Business Proposals: Writing Strategies," cited in Office Action dated Oct. 6, 2011, <http://www.morebusiness.com/running_your_business/management/v1n11.brc>, published Aug. 1, 1998.
University of Wisconsin—Eau Claire LTS Online Help Documentation, Microsoft Excel 2003/2004, using the Sort Command, https://web.archive.org/web/20080311184836/http://www.uwec.edu/Help/Excel03/srtcom.htm,Mar. 11, 2008,retrieved Oct. 1, 2014.
Paolucci et al., "Semantic Matching of Web Services Capabilities", 2002, Carnegie Mellon University, Pittsburgh, PA, USA.
Muhl, Charles J. "What is an Employee—The Answer Depends on the Federal Law." Monthly Lab. Rev. 125(2002): 9 pages.
Barton, Lisa Horwedel "Reconciling the independent contractor versus employee dilemma: a discussion of current developments as they relate to employee benefit plans." Cap. UL Rev 29 (2001): 63 pages.
Moran, Jenna Amato "Independent Contractor or Employee-Misclassification of Workers and Its Effect of the State." Buff. Pub. Int. LJ 28 (2009): 28 pages.
Webb, Teresa J., et al. "An empirical assist in resolving the classification dilemma of workers as either employees or independent contractors." Journal of Applied Business Research (JABR) 24. (2011): 22 pages.
Wood, Robert W. "Defining Employees and Independent Contractors." Bus. L. Today 17 (2007): 6 pages.

\* cited by examiner

ONLINE PROFESSIONAL BADGE

FIELD OF THE INVENTION

The present invention relates to badges. More particularly, the present invention relates to an online professional badge.

BACKGROUND OF THE INVENTION

A job posting site allows job seekers to post resumes. The job posting site also allows employers to browse through the resumes to search for qualified job seekers. However, prior art job posting sites suffer from a number of shortcomings. For example, the job posting site allows a job seeker to post only static information about the job seeker. As such, the job seeker is not able to actively market themselves to the employers. In addition, the employers must access the job posting site in order to view the job seeker's resume.

The present invention addresses at least these limitations in the prior art.

SUMMARY OF THE INVENTION

An object of the present invention is to provide an online professional badge within a services exchange medium. In the services exchange medium, buyers find and hire service providers "on demand" to get projects done quickly and cost effectively. Specifically, buyers post projects and service providers search for projects to work on.

In one aspect, a window resides at a location outside a services exchange medium accessible on a computing device comprises real-time data about a service provider, and a contact feature configured to initiate communication with the service provider. The real-time data includes a subset of information provided in a profile belonging to the service provider within the services exchange medium. For example, the online professional badge is able to display the service provider's top specialization areas, a feedback rating, a membership year, a picture and/or a video clip previously uploaded by the service provider within the services exchange medium, a number of reviews, a summary of skills, professional licenses, certifications, and other credentials, a portfolio link to the service provider's portfolio, and/or other information found within and outside the profile. Typically, the communication is chatting, calling, or inviting to bid. In some embodiments, viewers of the online professional badge are able to leave a message so that the service provider (e.g. badge owner) is able to reply asynchronously. The window also comprises an access feature configured to access the services exchange medium, a calendar feature configured to display availability of the service provider, a watchlist feature configured for enabling continued communication with the service provider, and a hire feature configured to initiate a hiring process without accessing other sites.

In another aspect, a method of creating interactive windows comprises receiving a request to create an interactive window configured to interface with a services exchange medium. The receiving includes obtaining an at least one instruction to personalize the interactive window. The method also comprises generating source code by a computing device for the interactive window. The interactive window is configured to display information about a service provider as a professional within the services exchange medium. Typically, the information is a subset of data provided in a profile belonging to the service provider within the services exchange medium. The method includes embedding the source code at a location outside the services exchange medium. The location is, but not limited to, in a web page, an email, a chat message, or a banner advertisement. In some embodiments, the interactive window has a first button configured to initiate communication with the service provider. The interactive window also has a second button configured to allow access to the services exchange medium. In other embodiments, the interactive window has a calendar feature configured to display availability of the service provider. Yet, in other embodiments, the interactive window has a watchlist feature configured to enable continued communication with the service provider. Yet, in other embodiments, the interactive window has a hire feature configured to initiate a hiring process without accessing other sites.

Yet, in another aspect, a system for creating portable interactive windows comprises a processor and an application executed by the processor. The application is for receiving a request to create a portable window configured to interface with a services exchange medium and for generating source code for the portable window. The application is executed online. The portable window is configured to display information about a service provider as a professional within the services exchange medium. The source code is selected, copied, and pasted into a destination located outside the services exchange medium. In some embodiments, the portable window has a first button configured to initiate communication with a service provider. The portable window also has a second button configured to allow access to the services exchange medium. In other embodiments, the portable window has a calendar feature configured to display availability of the service provider. Yet, in other embodiments, the portable window has a watchlist feature configured to enable continued communication with the service provider. Yet, in other embodiments, the portable window has a hire feature configured to initiate a hiring process without accessing other sites.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

Reference will now be made in detail to implementations of the present invention as illustrated in the accompanying drawings. The same reference indicators will be used throughout the drawings and the following detailed description to refer to the same or like parts.

Embodiments of the present invention are directed to an online professional badge. In some embodiments, the online professional badge is created by a service provider within a services exchange medium. In the services exchange medium, buyers find and hire service providers "on demand" to get projects done quickly and cost effectively. The service provider is also able to create a profile within the services exchange medium in order to be immediately connected to buyers looking for the service provider's expertise. Typically, the profile includes, but is not limited to, information found in a traditional print resume such as experience and credentials, a portfolio of work products completed by the service provider, and feedback from buyers whom the service provider has done work for within the services exchange medium. The profile also includes blogs, a picture, a video clip, and/or sound clip uploaded by the service provider. In addition, the profile allows a buyer to communicate with the service provider regarding a project. Communication methods within the services exchange medium include inviting the service provider to bid on the project, calling and/or chatting with the service provider. Other communication methods are possible. Preferably, the profile provides the buyer with real-time information about the service provider within the services exchange medium.

As mentioned above, the service provider is able to create the online professional badge within the services exchange medium. Typically, the online professional badge is configured to display a summary or a subset of the information within the service provider's profile. In some embodiments, the online professional badge resides anywhere on the Internet outside the services exchange medium. While the profile allows buyers to view real-time information about the service provider within the services exchange medium, the online professional badge allows others to view real-time information about the service provider outside the services exchange medium. As such, the online professional badge allows the service provider to actively market the service provider as a professional without requiring viewers to access other sites, including the services exchange medium.

Figure 1A:
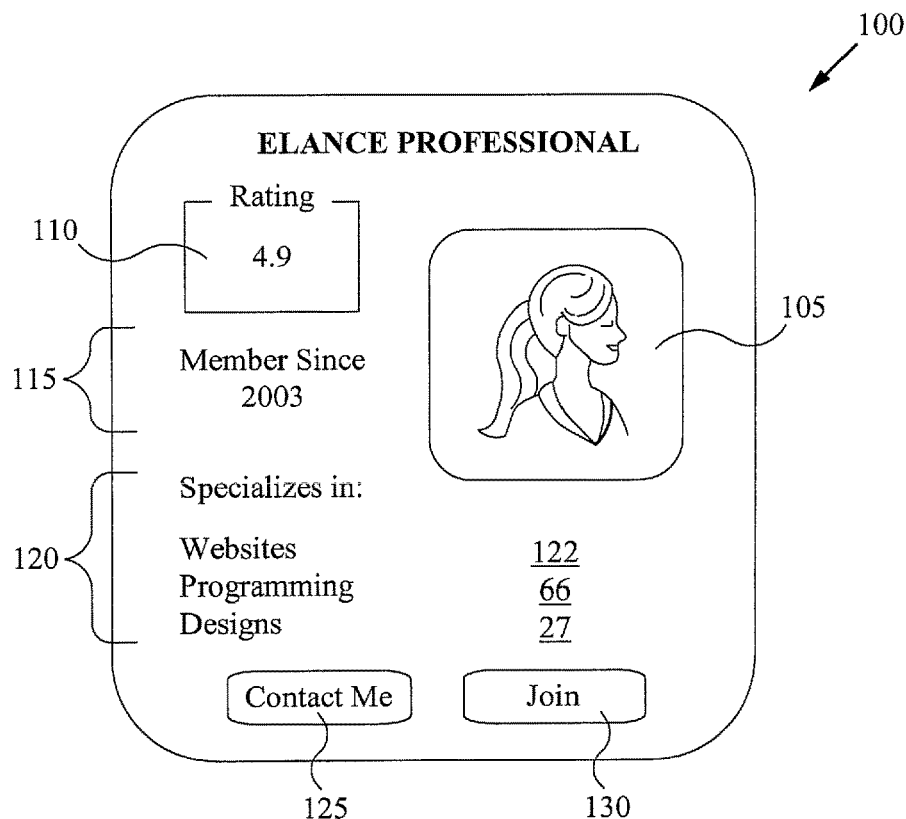
FIGS. 1A-1D illustrate different embodiments of an online professional badge in accordance with some embodiments of the present invention.
Figure 1B:
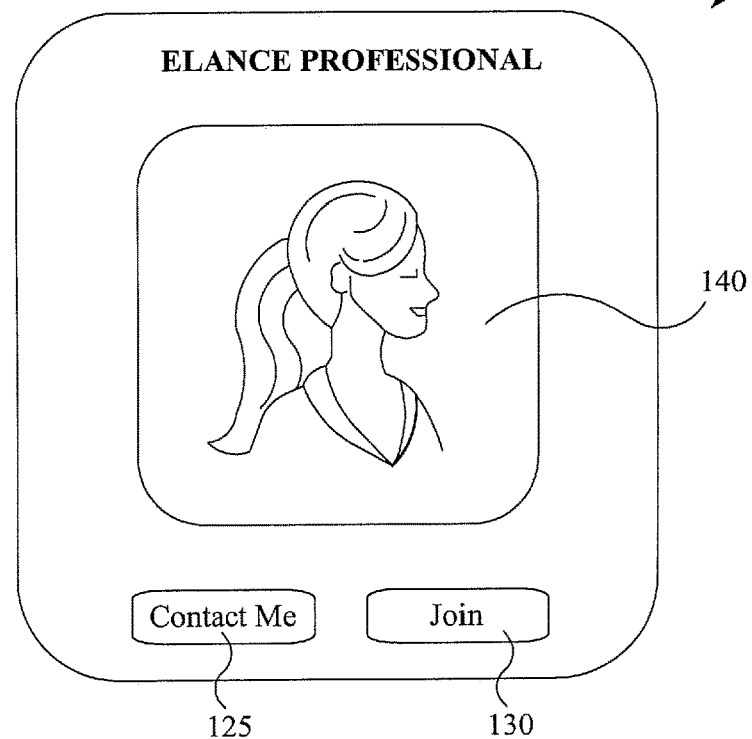
Figure 1C:
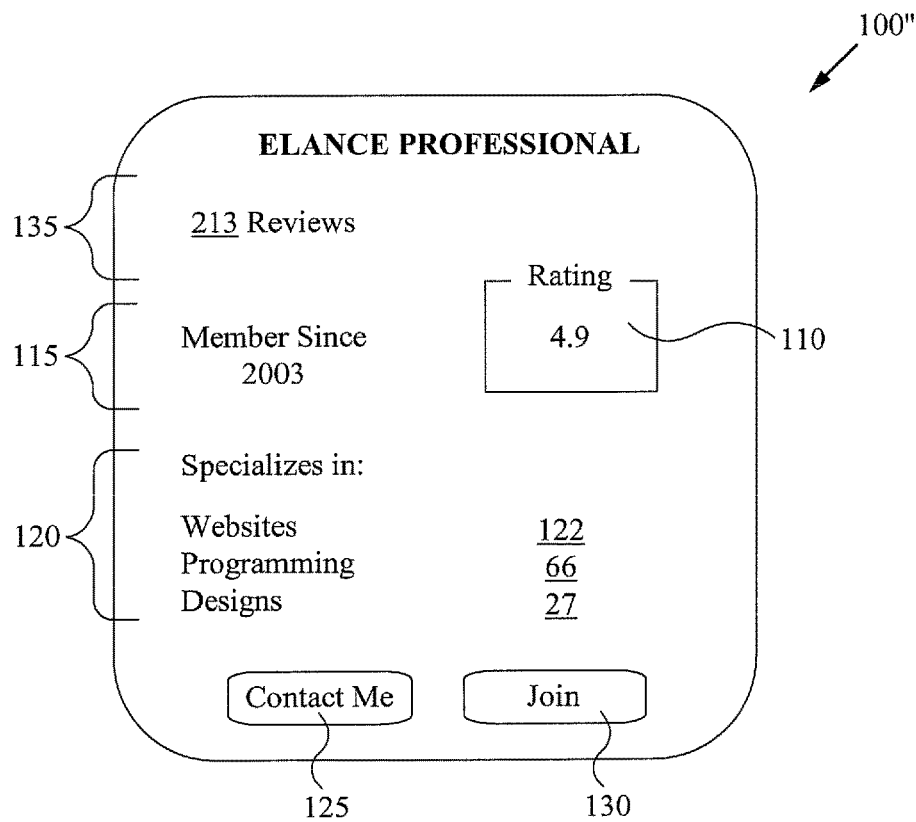
Figure 1D:
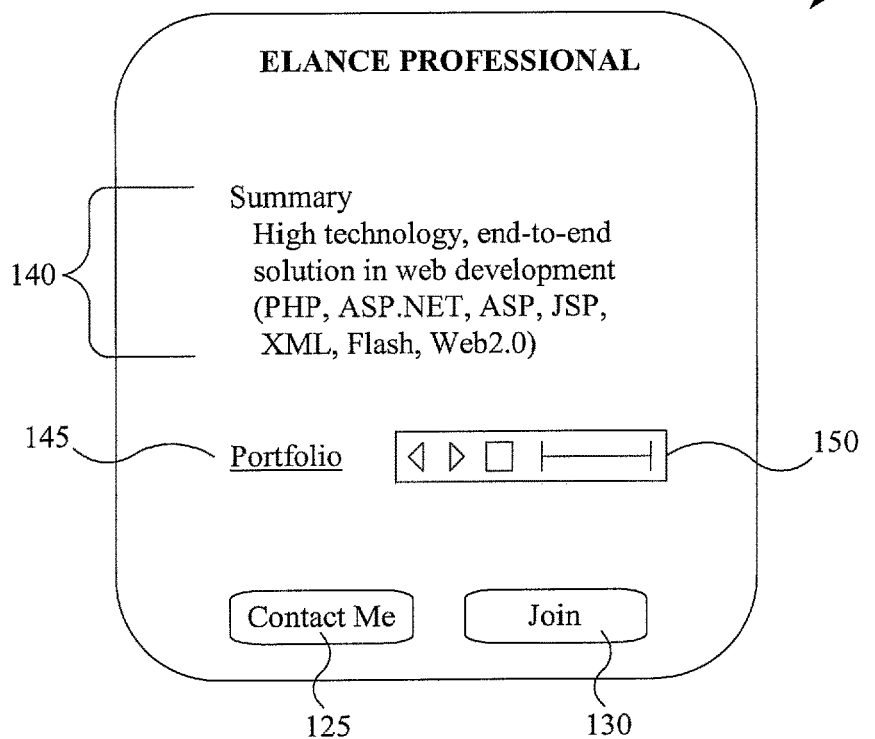

In some embodiments, the service provider is able to select one from a plurality of badge templates to create the online professional badge. The plurality of badge templates are designed by an entity. The entity is a party responsible for the services exchange medium or is a third party. FIGS. 1A-1D illustrate four exemplary embodiments of the online professional badge 100, 100', 100", 100''' as designed by the entity. In FIG. 1A, the online professional badge 100, according to a first template, displays the service provider's top three specialization areas 120, a feedback rating 110, a membership year 115, and a picture 105 previously uploaded by the service provider within the services exchange medium. In some embodiments, a number associated with each specialization area indicates a number of projects the service provider has completed within the services exchange medium. In FIG. 1B, the online professional badge 100', according to a second template, displays only a video clip 140 previously uploaded by the service provider within the services exchange medium. In FIG. 1C, the online professional badge 100", according to a third template, displays the feedback rating 110, a number of reviews 135, the membership year 115, and the top three specialization areas 120. In FIG. 1D, the online professional badge 100''', according to a fourth template, displays a summary of skills 140, a portfolio link 145 to the service provider's portfolio, an audio toolbar 150 to play the sound clip previously uploaded by the service provider within the services exchange medium. It should be understood that these templates are exemplary and do not limit the invention in any way.

In other embodiments, the service provider is able to customize the online professional badge by choosing a shape, a color, and a size of the online professional badge, and by selecting information from the profile to display in the online professional badge. In other embodiments, the service provider is able to add other information not found in the online professional profile. Yet, in other embodiments, the service provider is not able to select a template and/or customize the online professional badge. Instead, a default template is used to create every online professional badge. The online professional badge is automatically populated with information from the profile.

Some elements are standard and are a part of the online professional badge 100. The elements can or cannot be disabled by the service provider. In some embodiments, a Contact Me button 125 appears on a bottom-left corner of the online professional badge 100. Communication methods provided via the Contact Me button 125 are similar to those provided in the profile. The communication methods include inviting the service provider to bid on the project, calling and/or chatting with the service provider. As such, the Contact Me button 125 allows a viewer to initiate communication with the service provider without having to access the service provider's profile to do so. In some embodiments, the viewer is able to leave a message so that the service provider (e.g. owner of the badge) is able to reply asynchronously. In other embodiments, a Join button 130 appears on a bottom-right corner of the online professional badge 100. The Join button 130 allows the viewer to join or learn more about the services exchange medium by taking the viewer to the services exchange medium. Yet, in other embodiments, a horizontal scroll bar (not illustrated) and/or a vertical scroll bar (not illustrated) are also part of the online professional badge 100 if the size of the online professional badge 100 is not large enough to display all of the selected information. Other elements as part of the online professional badge 100 are possible.

Source code for the online professional badge 100 is typically written in scripting languages such as Javascript and Adobe Flash/Flex/Actionscript. Other scripting languages include, but not limited to, HTML, XHTML, DHTML, PHP, and/or ASP. Other scripting languages to write the source code for the professional badge 100 are possible. In some embodiments, a flash widget (a widget having flash capabilities or format) is embedded in the source code. For example, if the service provider wishes to display the video clip 140 as part of the online professional badge 100', the flash widget is embedded in the source code written in XHTML.

Figure 2:
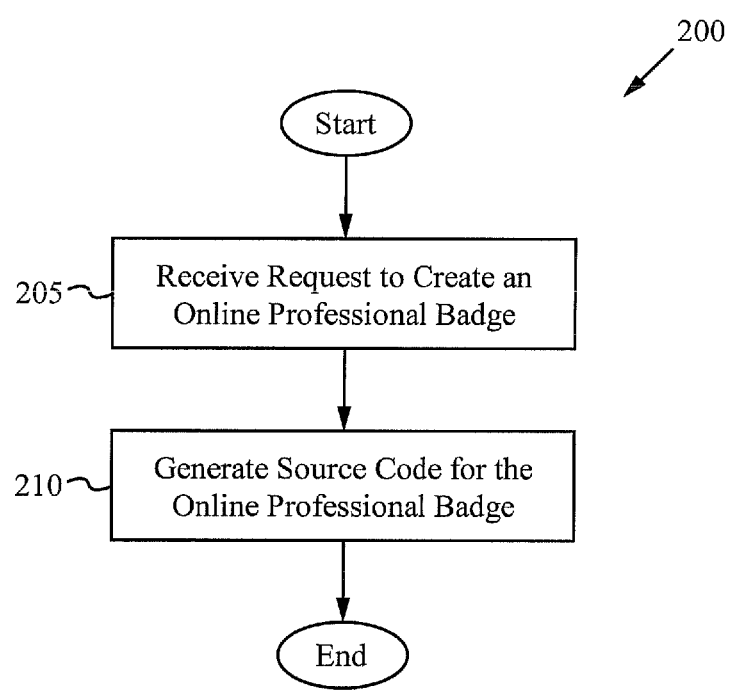
FIG. 2 illustrates a method of creating the online professional badge in accordance with some embodiments of the present invention.

FIG. 2 illustrates a process 200 of creating the online professional badge 100. At step 205, the services exchange medium receives a request to create the online professional badge 100. Typically, the service provider requests to create the online professional badge 100 within the services exchange medium. The request in some embodiments is achieved by clicking on a Create Badge link or a Create Badge button in the service provider's profile within the services exchange medium. In some embodiments, the services exchange medium allows the service provider to select a template for and/or customize the online professional badge 100, as described above. At step 210, the source code for the online professional badge 100 is then generated by the services exchange medium. Typically, the source code reflects the service provider's customization of the online professional badge 100.

The online professional badge 100 typically resides anywhere on the Internet outside the services exchange medium. In some embodiments, the online professional badge 100 is portable and embeddable in dating networks such as eHarmony®, social networks such as LinkedIn®, blogs, web pages, Craigslist, and/or other places on the Internet. In other embodiments, the online professional badge 100 is also embeddable in email messages, chat messages, and/or banner advertisements. The banner advertisements are typically distributed via advertisement networks.

Figure 3B:
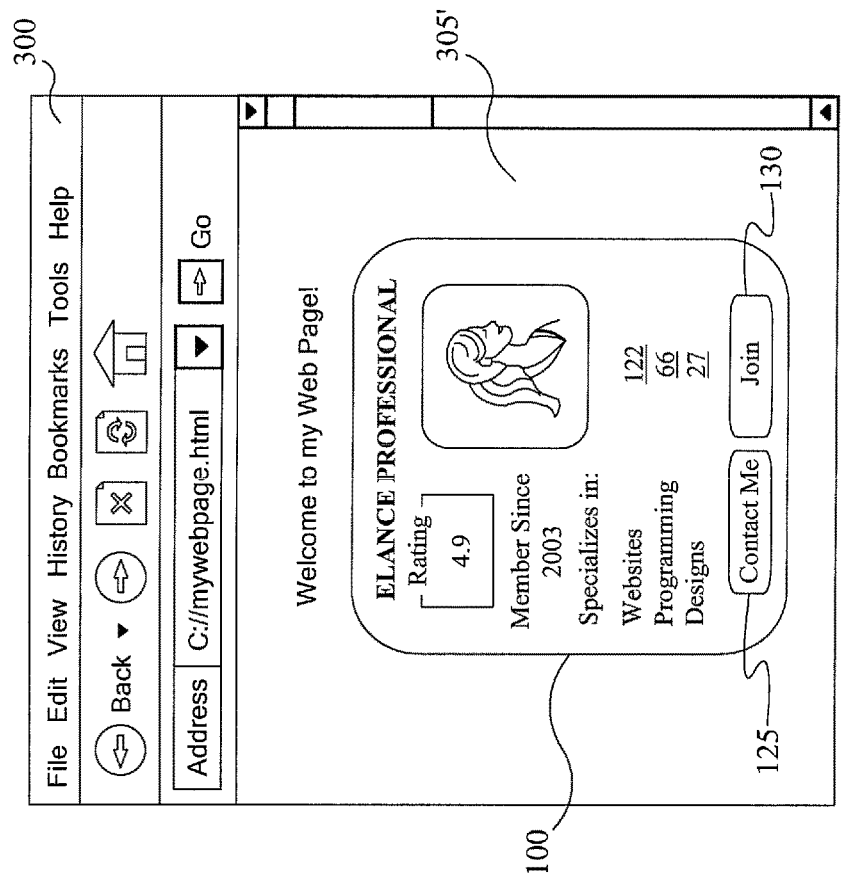
FIG. 3B illustrates an online professional badge embedded in the web page displayed in the web browser in accordance with some embodiments of the present invention.
Figure 3A:
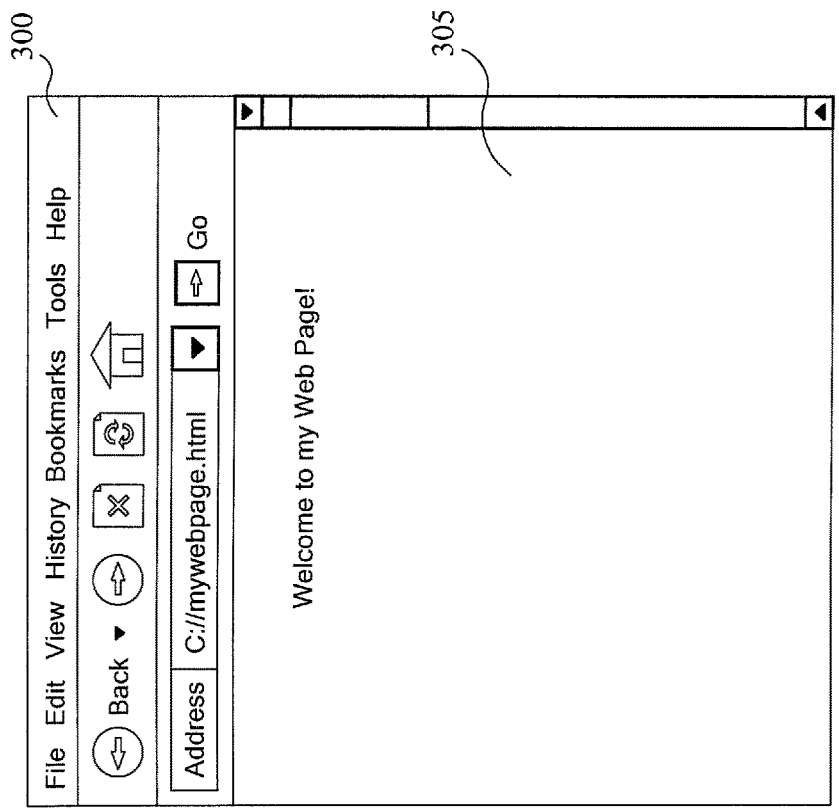
FIG. 3A illustrates a web page displayed in a web browser in accordance with some embodiments of the present invention.

In some embodiments, the online professional badge 100 serves as an interface or a bridge to the services exchange medium from where the online professional badge 100 resides on the Internet, such as from a personal web page. Assume that the personal web page belongs to the service provider. FIG. 3A illustrates the personal web page 305 displayed in a web browser 300 before embedding the online professional badge 100 in accordance with the present invention. The service provider embeds the online professional badge 100 in the personal web page 305 by selecting, coping and pasting the source code of the online professional badge 100 in a source page of the personal web page 305. The web browser 300 renders the edited source page and displays the online professional badge 100 as part of the personal web page 305', as illustrated in FIG. 3B. The online professional badge 100 displayed on the personal web page 305' introduces the viewer to the service provider as a professional within the services exchange medium. The viewer is able to see the service provider's profile by clicking on the online professional badge 100, communicate with the service provider via the Contact Me button 125, and/or access about the services exchange medium via the Join button 130. As such, the online professional badge 100 displayed on the personal web page 305' is an interface to the services exchange medium. It should be understood that the online professional badge 100 serving as the interface to the services exchange medium from the service provider's personal web page 305' is not intended to limit the invention in any way and is meant only as an example.

While the personal web page 305' introduces the service provider as a professional within the services exchange medium to viewers of the personal web page 305' at a constant rate, other locations/sites on the Internet introduce the service provider to others (e.g. members of a network) at an exponential rate. For example, the social network LinkedIn® exponentially introduces its members to one another through a concept known as connections. Assume that the service provider is a LinkedIn® member. A first degree connection includes Group A of people that the service provider personally knows in the network. A second degree connection includes Group B of people that people in Group A know. A third degree connection includes Group C of people that people in Group B know. A person in any of Group A, Group B, or Group C is able to view the service provider's LinkedIn® page. As such, embedding the online professional badge 100 in the LinkedIn® page introduces the service provider as a professional at the exponential rate to first, second, and third degree members within the LinkedIn® network.

Similar to embedding the online professional badge 100 in the personal web page 305', the service provider is able to embed the online professional badge 100 in the LinkedIn® page by selecting, copying and pasting the source code generated by the services exchange medium. The online professional badge 100 displayed on the LinkedIn® page is an the interface from the LinkedIn® social network to the services exchange medium. As such, LinkedIn® members able to see the service provider's profile by clicking on the online professional badge 100, communicate with the service provider via the Contact Me button 125, and/or access the services exchange medium via the Join button 130.

Figure 5:
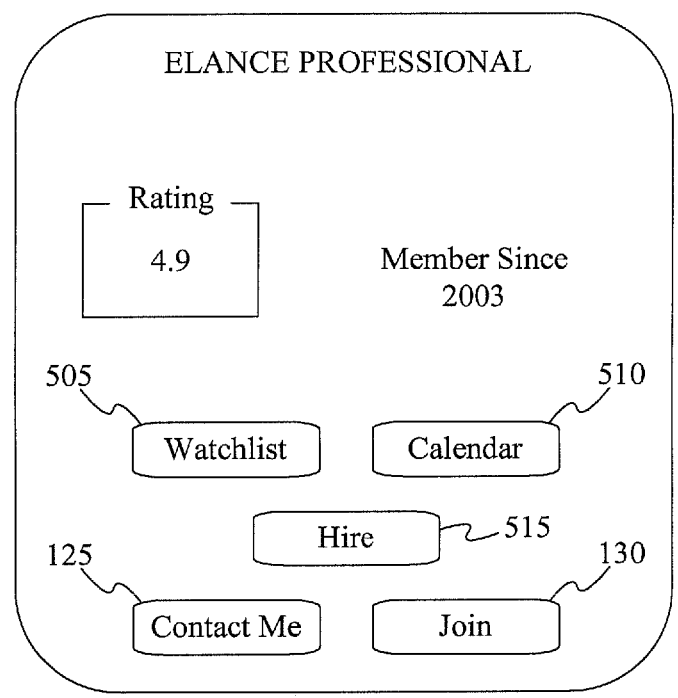
FIG. 5 illustrates another embodiment of the online professional badge in accordance with some embodiments of the present invention.

In some embodiments, the online professional badge has a watchlist feature. Continuing with the LinkedIn® example, the watchlist feature allows a LinkedIn® member, who is also a member of the services exchange medium (e.g. a buyer), to place a current communication with the service provider on hold, or to continue a past communication with the service provider without having to return back to the services exchange medium to do so. The LinkedIn® member is able to access the watchlist feature by clicking on a Watchlist link 505 located on the online professional badge, as illustrated in FIG. 5.

In other embodiments, the online professional badge has a calendar feature. The calendar feature allows the LinkedIn® member to review the service provider's availability. Typically, the calendar feature also allows the LinkedIn® member to reserve a block of the service provider's time for a project based on the service provider's availability. The LinkedIn® member is able to access the calendar feature by clicking on a Calendar link 510 located on the online professional badge, as illustrated in FIG. 5.

Yet in other embodiments, the online professional badge has a hire feature. The hire feature allows viewers of the online professional badge to initiate a hiring process. The hiring process does not require the viewers to access other sites. Viewers are able to access the hire feature by clicking on the Hire link 515 located on the online professional badge, as illustrated in FIG. 5.

As discussed above, the online professional badge 100 is embeddable at locations on the Internet outside the services exchange medium by the service provider. In some embodiments, the online professional badge 100 has a security feature which allows others to endorse the service provider. Specifically, per the service provider's authorization, others are also able to embed the service provider's online professional badge 100 at locations on the Internet outside the services exchange medium. A security feature disables elements of the online professional badge 100, such as the Contact Me button 125, if a perpetrator without legitimate rights embeds the service provider's online professional badge 100 at a location on the Internet outside the services exchange medium.

In some embodiments, the service provider is able to synchronize the online professional badge 100 with the service provider's profile within the services exchange medium. In other embodiments, the service provider is able to synchronize the online professional badge 100 with profiles outside the services exchange medium, such as with the service provider's LinkedIn® profile. Other features on the online professional badge 100 are possible.

The steps of the present invention are embodied in machine-executable instructions. These instructions can be used to cause a general-purpose or special-purpose processor that is programmed with the instructions to perform the steps of the present invention. Alternatively, the steps of the present invention can be performed by specific hardware components that contain hardwired logic for performing the steps, or by any combination of programmed computer components and custom hardware components.

Figure 4:
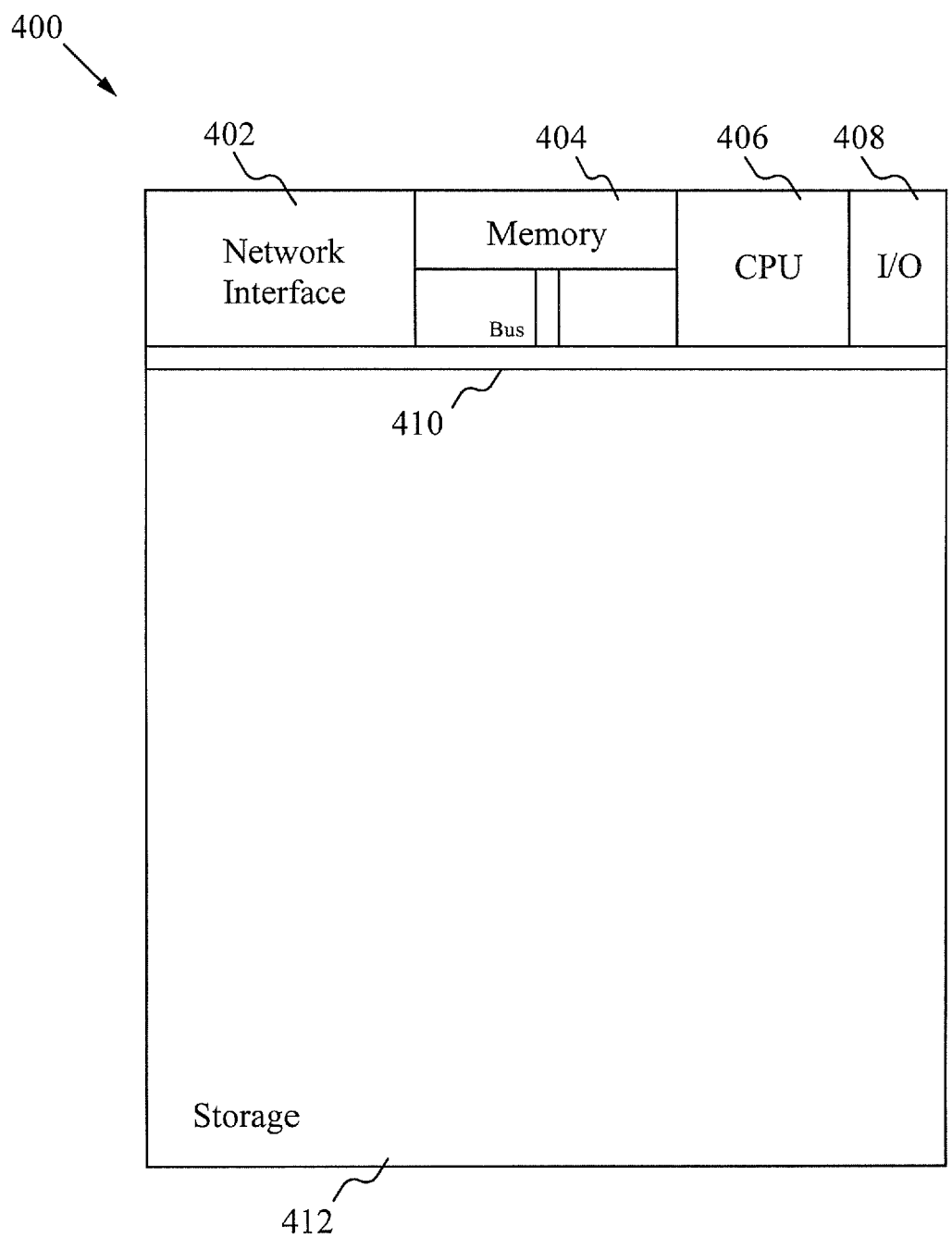
FIG. 4 illustrates a graphical representation of an exemplary computing device in accordance with some embodiments of the present invention.

In some embodiments, the present invention is provided as a computing device. FIG. 4 illustrates a graphical representation of an exemplary computing device 400 in accordance with the present invention. The computing device 400, such as a server stores, serves, computes, communicates, generates and/or displays information about the service provider within the services exchange medium. The service provider uses an Internet-ready device, such as a personal computer, to interact with the computer device 400 to create the profile and to generate the online professional badge. In general, a hardware structure suitable for implementing the computing device 400 includes a network interface 402, a memory 404, processor 406, I/O device(s) 408, a bus 410 and a storage device 412. The choice of processor is not critical as long as the processor 406 has sufficient speed. The memory 404 is any conventional computer memory known in the art. The storage device 412 is a hard drive, CDROM, CDRW, DVD, DVDRW, flash memory card or any other storage device. The computing device is able to include one or more network interfaces 402. An example of a network interface includes a network card connected to an Ethernet or other type of LAN. The I/O device(s) 408 are able to include one or more of the following: keyboard, mouse, monitor, display, printer, modem and other devices. Software used to create the online professional badge is likely to be stored in the storage device 412 and memory 404 and processed as an application is typically processed.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the online professional badge will occur. Consequently, the claims should be broadly construed, consistent with the spirit and scope of the invention, and should not be limited to their exact, literal meaning.

We claim:

1. A non-transitory computer readable medium storing instructions that, when executed by a computing device, cause the computing device to generate and display source code that is for rendering a window, wherein the generation is in response to a request that is activated from an online profile of a service provider located inside a services exchange medium, wherein the source code is adapted for embedding at a location outside the services exchange medium, wherein the window comprising:
   a. real-time data about the service provider, wherein the real-time data includes a subset of information that is automatically extracted from the service provider's online profile in accordance with configuration data of a window template selected after the request is activated from the service provider's online profile;
   b. a contact feature configured to initiate communication from the window with the service provider;
   c. a viewable source code for the window, wherein the source code is only selectable to be copied when the source code is displayed to the service provider outside the service exchange medium, wherein the viewable source code reflects a service provider's customization of an online professional badge introducing viewers to the service provider as a professional; and
   d. a security feature configured to disable the contact feature when the source code is embedded at a remote location by a perpetrator without legitimate embedding rights, wherein the window introduces the service provider to viewers from the location outside the services exchange medium without requiring the viewers to access the services exchange medium, to improve overall performance at the services exchange medium by enabling dynamic load management.

2. The non-transitory computer readable medium of claim 1, wherein the communication is one of chatting, calling, and inviting to bid, wherein the communication does not access the online profile that is located inside the services exchange medium.

3. The non-transitory computer readable medium of claim 1, wherein the window further comprises an access feature configured to access the profile of the service provider.

4. A non-transitory memory readable by a machine, tangibly embodying at least one program of instructions executable by at least one processor to perform a method of providing source code for rendering an interactive window, the source code adapted for embedding at a location outside a services exchange medium, the method comprising:
   a. receiving a request that is activated from an online profile of a service provider that is located in the services exchange medium to create an interactive window, wherein the interactive window is configured to display information that is automatically retrieved from the online profile of the service provider in accordance with configuration data of a selected template, wherein the interactive window is configured to interface with the services exchange medium and comprises a first button configured to initiate communication from the interactive window with the service provider; and
   b. generating a viewable source code for the interactive window, wherein the source code is only selectable to be copied when the source code is displayed to the service provider outside the service exchange medium, wherein the viewable source code reflects a service provider's customization of an online professional badge introducing viewers to the service provider as a professional, wherein the window introduces the service provider to viewers from the location outside the services exchange medium without requiring the viewers to access the services exchange medium, to improve overall performance at the services exchange medium by enabling dynamic load management.

5. The non-transitory memory of claim 4, wherein the receiving comprises obtaining an at least one instruction to personalize the interactive window.

6. The non-transitory memory of claim 4, wherein the interactive window is configured to display professional information about the service provider within the services exchange medium.

7. The non-transitory memory of claim 4, wherein the method further comprises embedding the source code at a location outside the services exchange medium.

8. The non-transitory memory of claim 7, wherein the location is in a web page.

9. The non-transitory memory of claim 7, wherein the location is in an email.

10. The non-transitory memory of claim 7, wherein the location is in a chat message.

11. The non-transitory memory of claim 7, wherein the location is in a banner advertisement.

12. The non-transitory memory of claim 4, wherein the interactive window comprises a second button configured to allow access to the services exchange medium.

13. The non-transitory memory of claim 4, wherein the interactive window comprises a calendar feature configured to display availability of the service provider and to reserve a block of the service provider's time for a project based on the availability.

14. The non-transitory memory of claim 4, wherein the interactive window comprises a watchlist feature configured to enable continued communication with the service provider.

15. The non-transitory memory of claim 4, wherein the interactive window comprises a hire feature configured to initiate a hiring process without accessing other sites.

16. A system for optimizing performance of a services exchange medium via portable interactive windows comprising:
    a. a processor;
    b. an application executed by the processor, the application for:
        i. receiving a request that is activated from an online profile of a service provider to create a portable window, wherein the portable window is configured to display information that is automatically retrieved from the online profile of the service provider and is configured to be embedded at a location external to but interfaces with the services exchange medium and comprises a first button configured to initiate communication from the portable window with the service provider;
        ii. providing a plurality of templates for creating the portable window, wherein each of the templates includes configuration information that indicates which subset of content in the online profile to extract therefrom to be included in the portable window; and
        iii. generating viewable source code for the portable window, wherein the viewable source code reflects a selected template from the plurality of templates, wherein the viewable source code is viewable outside the service exchange medium, wherein the viewable source code reflects a service provider's customization of an online professional badge introducing viewers to the service provider as a professional;
    e. a first remote location displaying the portable window, wherein the source code for the portable window is included in a source page associated with the first remote location, wherein the window introduces the service provider to a first viewer from the first remote location without requiring the first viewer to access the services exchange medium; and
    f. a second remote location different from the first remote location and displaying the portable window, wherein the source code for the portable window is included in a source page associated with the second remote location, wherein the window introduces the service provider to a second viewer from the second remote location without requiring the second viewer to access the services exchange medium, wherein the introductions from the remote locations improve overall performance at the services exchange medium by enabling dynamic load management.

17. The system of claim 16, wherein the application is executed online.

18. The system of claim 16, wherein the portable window is configured to display information about the service provider as a professional within the services exchange medium.

19. The system of claim 16, wherein the source code is manually selected, manually copied, and manually pasted into a destination by a user viewing the source code, the destination is located outside the services exchange medium.

20. The system of claim 16, wherein the portable window comprises a second button configured to allow access to the services exchange medium.

21. The non-transitory computer readable medium of claim 1, wherein the window further comprises a feature configured to allow others to endorse the service provider.

22. The non-transitory computer readable medium of claim 1, wherein the window further comprises an element configured to perform a network related function upon activation of the element.

23. The system of claim 16, wherein the application is also for synching the portable window with content outside the services exchange medium.

24. The system of claim 16, wherein the application is also for synching the portable window with content within the services exchange medium.

25. The non-transitory computer readable medium of claim 1, wherein the window automatically accesses the service provider's online profile each time the window is rendered at the location outside the services exchange medium such that the real-time data is synched with data in the online profile of the service provider.

* * * * *